United States Patent [19]
Hoeptner, III

[11] 4,291,416
[45] Sep. 22, 1981

[54] CHAIN TENSIONER

[76] Inventor: Herbert W. Hoeptner, III, 273 Hermosa, San Luis Obispo, Calif. 93401

[21] Appl. No.: 19,557

[22] Filed: Mar. 12, 1979

[51] Int. Cl.³ .......................................... F16H 7/12
[52] U.S. Cl. ................................... 474/138; 188/67; 192/111A; 403/368
[58] Field of Search ............... 74/242.1 TA, 242.11 C, 74/242.1 FP, 242.1 R, 242.11 R, 242.14 R, 531; 188/67; 403/368; 192/111 A; 474/135, 138, 139

[56] References Cited

U.S. PATENT DOCUMENTS

| | | | |
|---|---|---|---|
| 847,164 | 3/1907 | Corn | 188/67 |
| 1,031,637 | 7/1912 | Fischer | 188/67 |
| 1,374,643 | 4/1921 | Fischbach | 74/242.11 R |
| 1,744,746 | 1/1930 | Brown | 74/242.11 R |
| 4,040,305 | 8/1977 | Cadic | 74/242.1 A |
| 4,068,750 | 1/1978 | Gatewood | 192/111 A |

FOREIGN PATENT DOCUMENTS

| | | | |
|---|---|---|---|
| 512036 | 6/1952 | Belgium | 74/242.1 R |
| 827151 | 1/1952 | Fed. Rep. of Germany | 74/242.11 R |
| 958070 | 2/1957 | Fed. Rep. of Germany | 74/242.11 R |
| 474889 | 10/1952 | Italy | 74/242.11 R |
| 696586 | 9/1953 | United Kingdom | 74/242.11 R |
| 849270 | 9/1960 | United Kingdom | 74/242.11 R |

Primary Examiner—C. J. Husar
Assistant Examiner—Conrad Berman
Attorney, Agent, or Firm—William W. Haefliger

[57] ABSTRACT

A chain tensioner comprises: a plunger yieldably urged and displaceable in one direction to transmit chain tensioning force to a chain, and a wedgable means coacting with the plunger to block its retraction.

12 Claims, 4 Drawing Figures

U.S. Patent    Sep. 22, 1981    4,291,416
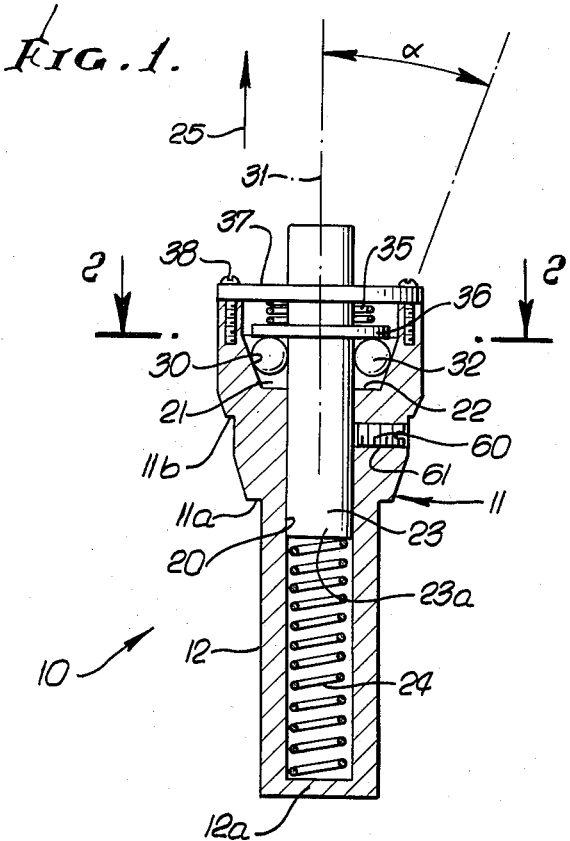
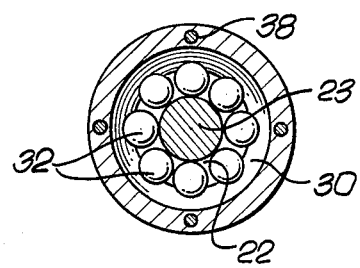
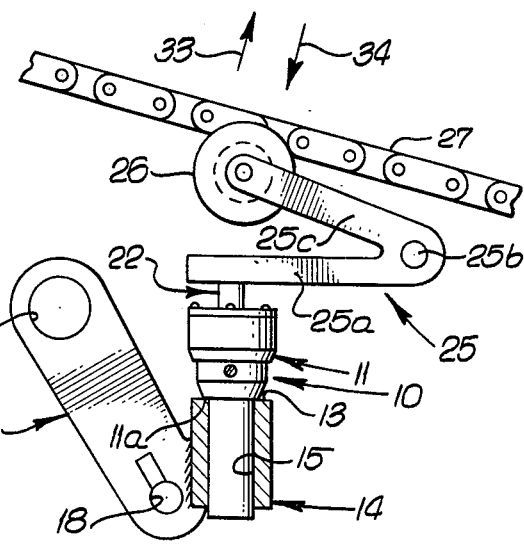
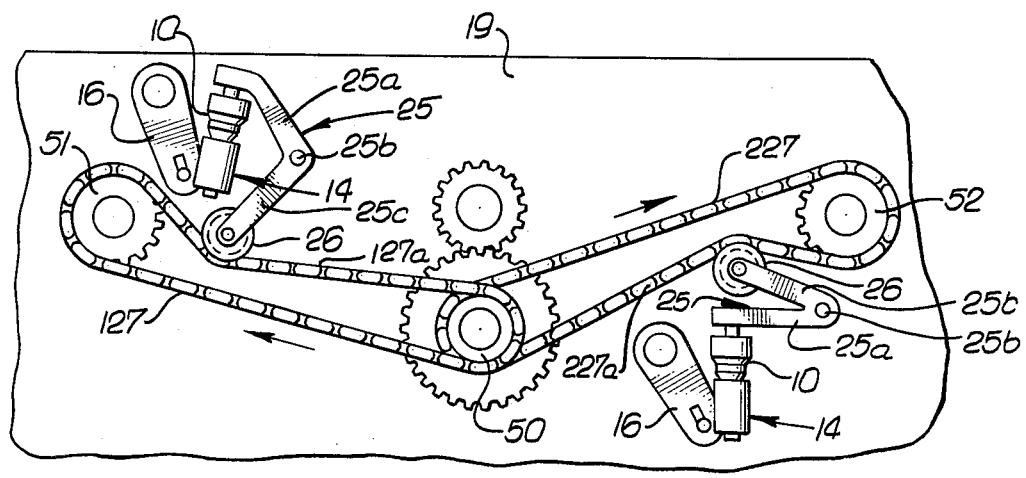

CHAIN TENSIONER

BACKGROUND OF THE INVENTION

This invention relates generally to chain tensioning apparatus, and more particularly concerns a mechanically ratcheting chain tensioner particularly well adapted to use on engines employing chains to drive cam shafts.

Currently-in-use chain tensioners on certain vehicles employ a hydraulic ratcheting design. Fluid on one side of a piston is allowed to flow through a small opening at the top side of the piston to the opposite side. As a result, when the piston tries to return, the fluid is not able to flow back through the opening because a small spring loaded ball seals the hole. One problem with such a device stems from the need for seals to prevent loss of fluid. Seal wear leads to malfunction and risk of expensive damage to the engine due to chain slippage or vibration. Further, such devices require very accurate fits and precision machining, leading to high cost. Avoidance of such problems has led to the use of adjustable bolts to tension chains, the bolts being locked after their adjustment; however, the problem here is the lack of automatic adjustment, so that a chain can stretch and malfunction before the need to adjust the bolt is detected.

Accordingly, there is a need for a device that is automatically adjustable, that has infinitely varying ratcheting capability, and that is not hydraulic, i.e. does not require seals.

SUMMARY OF THE INVENTION

It is a major object of the invention to provide a solution to the above described problems and difficulties. Basically, the chain tensioner, which meets the described need, comprises: a plunger or other element yieldably urged in the direction, as by a spring, to exert forces operable to tighten a chain; and a wedgable means (as for example rollers located between a ramp and the plunger or element) co-acting with the plunger to block plunger retraction.

As will appear, the ramp surface is typically frusto-conical and coaxial with the plunger; the wedgable means may comprise multiple rollers such as balls spaced about the axis, in non-rollable wedging engagement with the ramp surface and the plunger as the latter advances; and means yieldably urging the rollers or balls toward such wedging interengagement may comprise an annular part movable or slidable along the plunger, and a second spring urging that part against all the balls. Also, means is provided to releasably lock the plunger in selected retracted position so that the device may be assembled to an engine and then released to allow the plunger to tension the chain. Finally, the device is easily fitted in a positioning mount attached to an engine housing (or other engine structure), as will be seen.

These and other objects and advantages of the invention, as well as the details of an illustrative embodiment, will be more fully understood from the following description and drawings, in which:

DRAWING DESCRIPTION

FIG. 1 is a vertical section through a chain tensioning device incorporating the invention;

FIG. 2 is a horizontal section taken on lines 2—2 of FIG. 1;

FIG. 3 is a view of the FIG. 1 tensioner carried by a holder; and

FIG. 4 is a schematic representation of two of the tensioners, carried by the holders, and tensioning two cam shaft driving chains, on an engine.

DETAILED DESCRIPTION

In the drawings, the mechanically ratcheting chain tensioner 10 includes an axially elongated body having a head 11 on an elongated stem portion 12. The head may, for example, include external step shoulders 11a and 11b, the former being engageable with the end 13 of a mount or holder 14 when the stem portion 12 is inserted into a bore or socket 15 defined by the holder. The remainder of the holder includes an angularly extending member 16 containing openings 17 and 18 to receive fasteners that connect the holder to an engine housing, as for example, as indicated at 19 in FIG. 4.

Referring again to FIG. 1, the body contains a bore 20 extending within the stem portion 12 and within the lower portion of the head 11, the bore opening to a recess 21 in the head at the location of annular interior step shoulder 22. A plunger rod 23 is movable axially in the bore, and a spring 24 in the bore urges the plunger in the direction indicated by arrow 25. Compression spring 24 is retained between the lower end 23a of the plunger and the bottom interior wall 12a of the body stem portion 12. FIG. 3 shows that the plunger transmits spring force to one arm 25a of a bell crank 25 pivoted at 25b, the other arm 25c of the crank carrying and idler roller or spool 26 which engages the side of a chain 27 to deflect the latter and thereby tension it.

Referring again to FIG. 1, the body head 11 defines an interior ramp surface 30 which faces the plunger, and which tapers in the axial direction opposite that of arrow 25. The axis appears at 31. Surface 30 is typically frusto-conical and is coaxial with the axis 31. Rollable means is located between the ramp surface 30 and the outer cylindrical surface of the plunger, such rollable means typically comprising multiple rollers such as balls 32 as, for example, eight balls spaced side-by-side in a ring about the plunger. In addition, means is provided to yieldably urge the rollable means into wedging engagement with the ramp surface and with the plunger, whereby the plunger may be displaced endwise by the spring in axial direction 25, but is blocked against displacement in the opposite axial direction. Accordingly, mechanical "infinite" ratcheting chain tensioning is provided to constantly urge the chain in a tensioning direction (see direction 33 in FIG. 3) and to move in that direction as the chain wears or stretches, but to block sideward vibration of the chain by preventing lateral movement of the chain in the reverse lateral direction (see arrow 34 in FIG. 3).

As shown in FIG. 1, the means to yieldably urge the balls into wedging interengagement with the ramp surface 30, and the plunger, typically and advantageously comprises a second compression spring 35, and an annular part such as a washer 36 fitting about, i.e. centered by, the plunger and interposed between the spring and the balls. A cap 37 is removably retained in the head, as by fasteners 38, to provide a backer surface, the spring 35 compressively retained between that surface and the washer. The spring is characterized as providing sufficient force, transmitted to the balls by the washer, as to prevent rolling of the balls as the plunger moves in the direction 25. To this end, the angle α of ramp surface 30 from axis 31 should be less than 45°, and typically should be between 15° and 25°. For best results, angle α should be about 19°.

FIG. 4 shows two mechanical chain tensioners 10, carried by mounts 14, exerting tensioning force transmitted to chain stretches 127a and 227a. The latter are associated with chains 127 and 227 that are typically driven by sprockets 50 on the engine crank shaft, the chains in turn driving the sprockets 51 and 52 on engine cam shafts.

Finally, FIG. 1 shows a means such as a set screw 60 having adjustable threaded connection at 61 with the head 11, to engage the plunger 22 and lock it in selected retracted position. This allows the device to be fitted into the socket 15 with plunger 22 and crank 25 retracted to allow the roller 26 to be fitted to the chain; thereafter, the set screw is released, and the plunger is advanced by spring 24 to tension the chain 27.

The rollers or balls referred to above comprise one form of wedgable means in the environment of the invention, other forms being usable.

I claim:

1. A tensioning device for tensioning a chain, comprising
 (a) an axially elongated body means having a stem portion with a bore therein,
 (b) a plunger carried by the body means and movable axially relative thereto in the bore, and a first compression spring in the bore urging the plunger axially in a first direction to exert biasing force operable to tension said chain,
 (c) the body means having an interior ramp surface facing the plunger, the ramp tapering inwardly in a second direction which extends generally opposite said first direction,
 (d) wedgable means located between the ramp surface and the plunger, and urging means urging the wedgable means into wedging engagement with the ramp surface and the plunger whereby the plunger may be displaced by the first spring in said one direction but is blocked against displacement in said opposite direction,
 (e) and a holder defining a socket receiving said stem portion for locating said stem portion so that said plunger is urged in a chain tensioning direction by said first spring.

2. The combination of claim 1 wherein said ramp surface is frusto-conical and coaxial with said axis.

3. The combination of claim 1 wherein said wedgable means comprise multiple rollers spaced about said axis.

4. The combination of claim 3 wherein said rollers comprise balls.

5. The combination of claim 1 wherein said means yieldably urging the wedgable means comprises a second spring, movable means engaging the wedgable means, and a backer surface on the body means, the second spring compressed between the backer surface and said movable means.

6. The combination of claim 5 wherein the wedgable means comprise balls, and said part is annular and extends about said plunger.

7. The combination of claim 1 including a means to releasably lock the plunger in a selected retracted axial position, whereby the plunger may be released to extend and exert a biasing force.

8. The combination of claim 1 including a chain engaging idler operatively connected with the plunger.

9. The combination of claim 8 including a bell crank having two arms, one arm mounting the idler, and the other arm operatively connected to the plunger.

10. The combination of claim 1 wherein said holder is connected to an engine.

11. The combination of claim 10 wherein the stem portion is removably received in the socket, and the body means defines a shoulder engaging the holder to limit insertion of the stem in the socket.

12. The combination of claim 1 wherein the body defines a closed end bore, and the plunger is guidedly slidable in said bore.

* * * * *